United States Patent [19]
Grove et al.

[11] 3,998,089
[45] Dec. 21, 1976

[54] LIQUID METER PROVER APPARATUS

[75] Inventors: Marvin H. Grove, Houston; Ronald G. Dunegan, Katy, both of Tex.

[73] Assignee: M & J Valve Company, Houston, Tex.

[22] Filed: Nov. 10, 1975

[21] Appl. No.: 630,549

[30] Foreign Application Priority Data

July 11, 1975 United Kingdom ............. 29266/75

[52] U.S. Cl. ................................................. 73/3
[51] Int. Cl.[2] ........................................... G01F 25/00
[58] Field of Search ........................ 73/3; 137/268

[56] References Cited
UNITED STATES PATENTS

| 3,246,666 | 4/1966 | Parkin et al. | 73/3 |
| 3,738,153 | 6/1973 | Simmons | 73/3 |
| 3,911,724 | 10/1975 | Grove et al. | 73/3 |

FOREIGN PATENTS OR APPLICATIONS 1,203,735    1/1959    United Kingdom ..................... 73/3

Primary Examiner—S. Clement Swisher
Attorney, Agent, or Firm—Flehr, Hohbach, Test, Albritton & Herbert

[57] ABSTRACT

Undirectional meter prover apparatus for checking and calibrating liquid flow meters. An interchange for transferring a sphere from the outlet to the inlet end of a metering pipe is provided with a shuttle assembly having backflow preventing means which seals the interchange body against backflow for certain operating conditions, particularly when the shuttle assembly is at or near sphere receiving position. Preferably guide means is provided which is engaged by the backflow preventing means.

5 Claims, 6 Drawing Figures

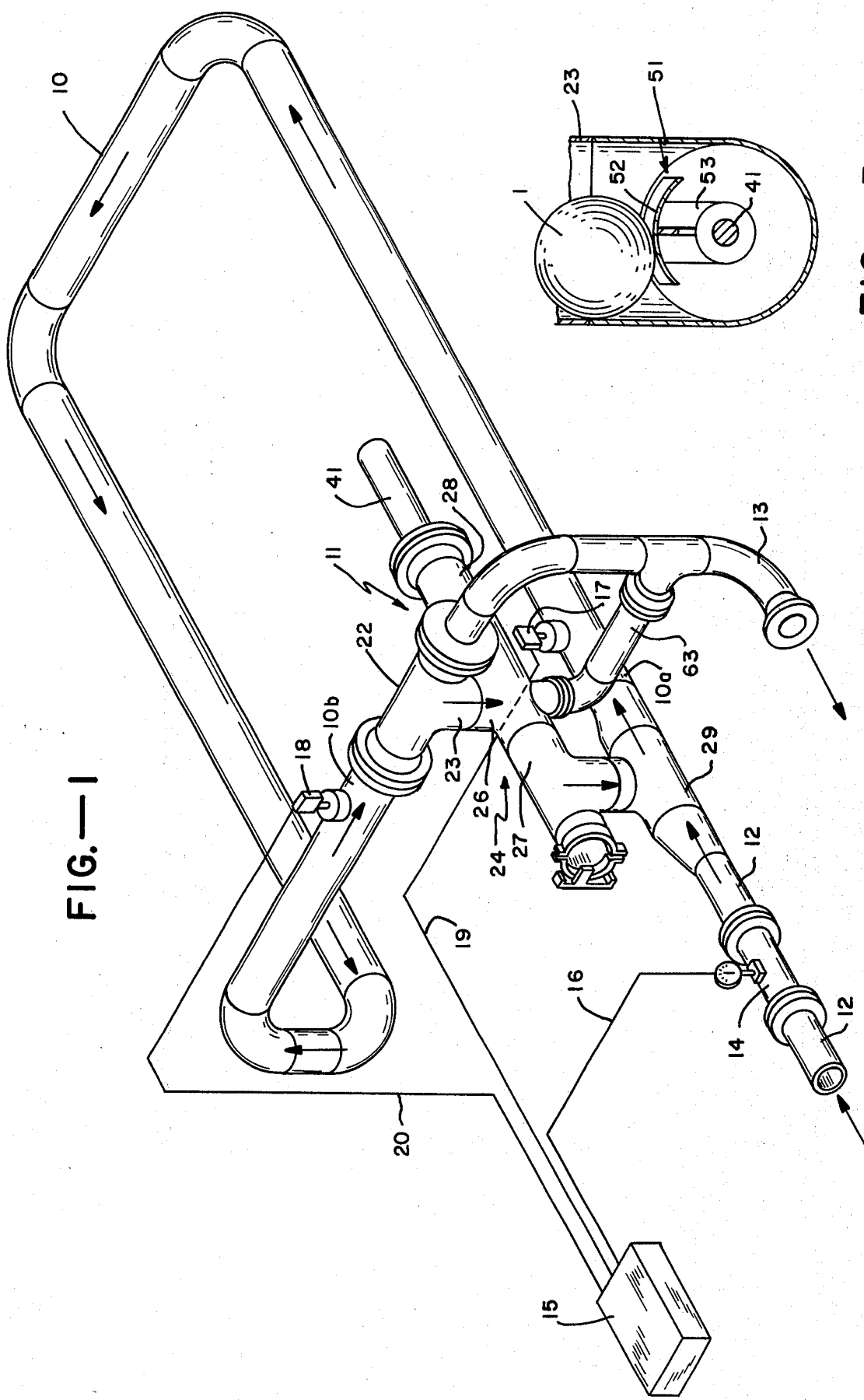

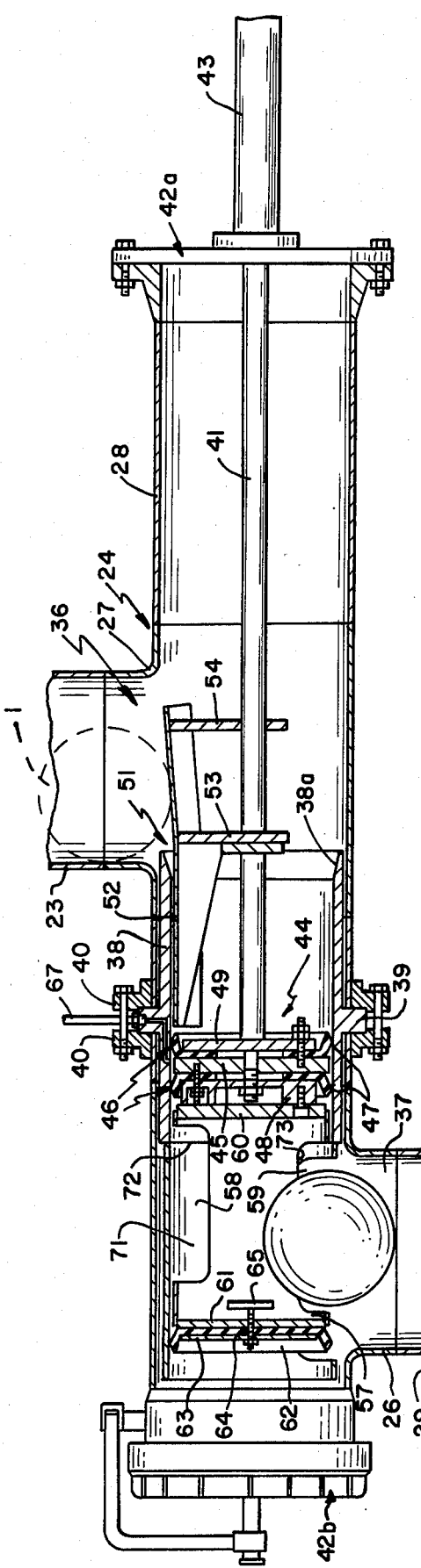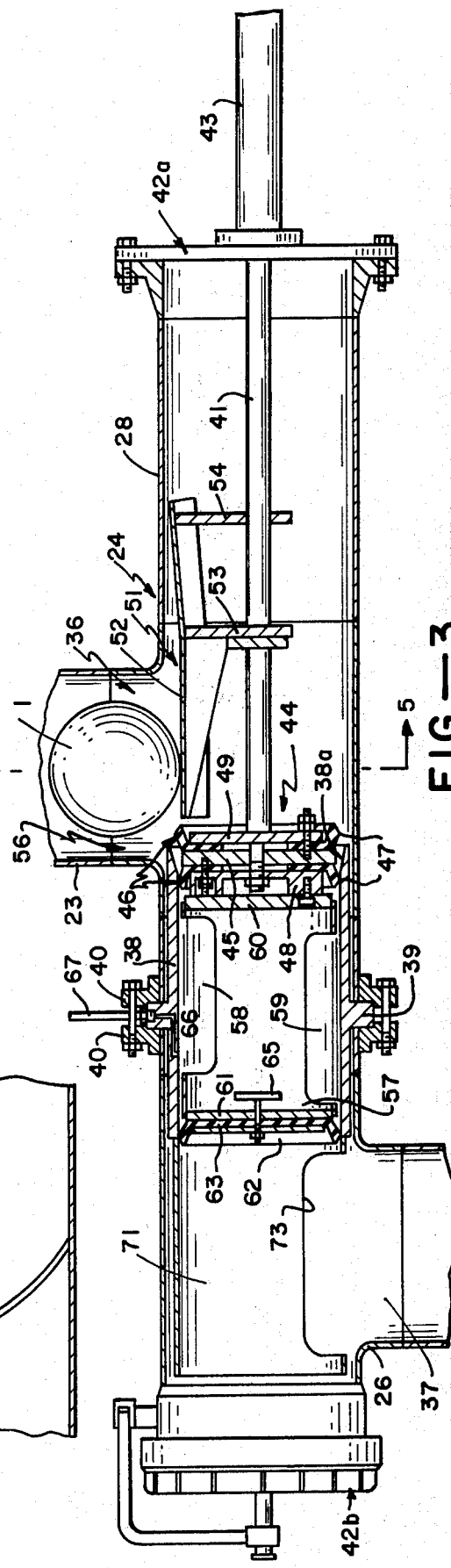

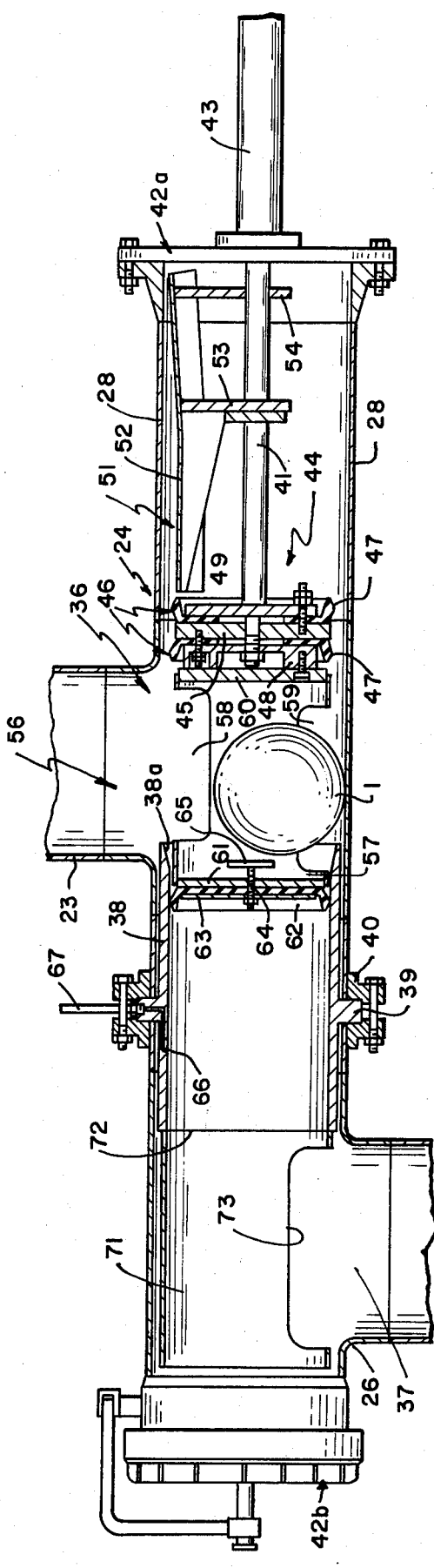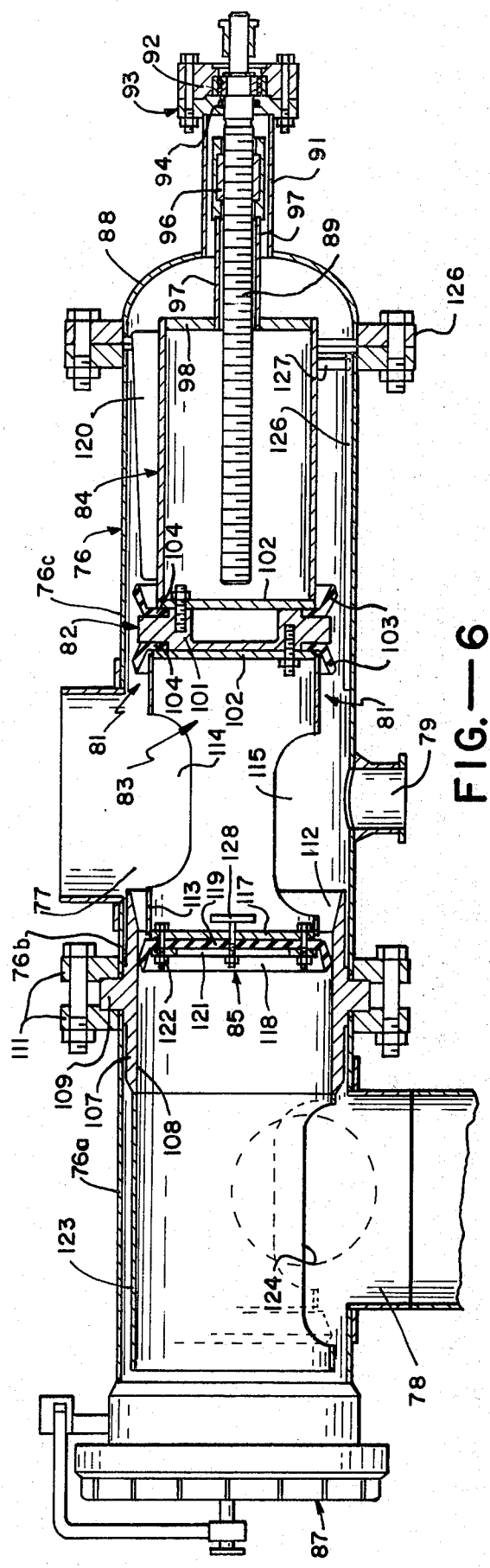

LIQUID METER PROVER APPARATUS

CROSS REFERENCE TO RELATED APPLICATIONS

Reference is made to our copending application in the United Kingdom of Great Britain and Northern Ireland No. 29266/75 filed July 11, 1975, which discloses certain features (but not all) of the meter prover shown in FIGS. 1 – 5 of this application.

BACKGROUND OF THE INVENTION

This invention relates generally to apparatus for launching spheres into liquid pipelines, and particularly to meter provers making use of such apparatus.

U.S. Pat. No. 3,911,724 issued Oct. 14, 1975, discloses apparatus which can be employed for introducing spheres into a line, and which when incorporated in a meter prover of the unidirectional type becomes an interchange which receives a sphere from the outlet end of the metering loop and causes it to be launched into the inlet end of the loop to commence a meter proving run. The apparatus makes use of a shuttle assembly which is reciprocated between sphere receiving and launching positions, and which operates within a body which forms a connection between the outlet and inlet ends of the metering loop. The shuttle assembly includes a plunger which establishes a seal for the interchange body when the shuttle means is in or near sphere launching position. It also includes a sphere carrier which receives the sphere when it is delivered from the outlet end of the metering loop. It serves to transport the sphere from sphere receiving to sphere launching position by reciprocation of the shuttle assembly. The sphere carrier also has means which prevents substantial backflow of liquid through the interchange when the shuttle assembly is in sphere receiving position. In the embodiment disclosed in said patent the means for controlling backflow through the interchange consists of a circular flow restricting baffle or barrier which is formed as a part of or is mounted on the sphere carrier, and which in the sphere receiving position of the shuttle means is positioned within a sleeve that is carried by the body and which cooperates with the plunger assembly.

One characteristic of the embodiments disclosed in said patent is that the backflow control means restricts backflow but does not provide an interchange seal. Also parts of the shuttle assembly may be forced out of alignment with the axis of the body, particularly when the apparatus is made in the larger sizes (e.g., for handling spheres of from 20 to 40 inches or more in diameter).

SUMMARY OF THE INVENTION AND OBJECTS

In general, it is an object of the invention to provide an improved unidirectional meter prover of the type disclosed and claimed in said U.S. Pat. No. 3,911,724.

Another object is to provide a meter prover of the type disclosed in said patent in which backflow through the interchange body is prevented by means which forms an interchange seal when the shuttle assembly is in sphere receiving position, and for a substantial amount of travel of the shuttle toward or away from such position.

Another object of the invention is to provide an improved meter prover in which the shuttle assembly is effectively guided to prevent misalignment.

The present invention includes a hollow interchange body having a first opening through which a sphere may pass from the outlet of a metering pipe loop and a second opening spaced axially from the first through which a sphere may pass from the body to the inlet end of the prover loop. A shuttle assembly is disposed within the body and includes a plunger and a sphere carrier having a sphere accommodating cavity. The shuttle assembly is movable in opposite directions between a sphere launching and a sphere receiving position. A cylindrical sleeve is carried by the body and is located between the first and second body openings. The sleeve has an internal diameter greater than the diameter of the sphere. Resilient sealing means is carried by the plunger and forms a seal between the plunger and the sleeve. Backflow preventing means is mounted on the sphere carrier and is constructed to establish a seal for the interchange when it is within the sleeve. Preferably guide means forms an extension of the sleeve and is engaged by the backflow preventing means when the latter is in positions outside the sleeve.

Additional objects and features of the invention will appear from the following description in which the preferred embodiments have been set forth in detail in conjunction with the attached drawing.

BRIEF DESCRIPTION OF THE DRAWING

FIG. 1 is a perspective view illustrating a meter prover incorporating the invention;

FIGS. 2, 3 and 4 are side elevational views in section illustrating different operating conditions for the sphere launching device incorporated in the meter prover of FIG. 1;

FIG. 5 is a cross-sectional view taken along the line 5 — 5 of FIG. 3; and

FIG. 6 is a side elevational view in section illustrating another embodiment of the invention.

DESCRIPTION OF THE PREFERRED EMBODIMENTS

The unidirectional prover illustrated in FIG. 1 consists of a meter proving pipe loop 10 having inlet and outlet portions 10a and 10b. The inlet and outlet portions are connected by the interchange 11, which serves to receive a sphere at the end of a meter proving run, and is arranged to transport and relaunch the sphere into the inlet portion 10a when it is desired to commence a new run. Upstream pipe 12 supplies liquid from the main line to the meter prover, and downstream pipe 13 returns the liquid back to the main line. A flow meter 14 (e.g., of the turbine type) is shown interposed in line 12. It is the function of the meter prover to make flow rate determinations which can be used for calibrating or correcting the readings of meter 14. Generally such a meter is provided with means for generating electrical pulses, the frequency of which is in direct proportion to the rate of flow through the meter body. Suitable means such as an electronic counter 15 is shown connected to the meter 14 by cable 16, and serves to provide flow readings.

The meter proving pipe loop 10 is provided with sphere detectors 17 and 18 located in the inlet and outlet portions. These devices are shown connected to the counter 15 by cables 19 and 20, whereby controlling start and stop pulses are supplied to the counter. The mode of operation of such equipment is as follows. Assuming that a sphere is launched into the inlet 10a of the metering pipe, it is flow-propelled through the pipe and past the detectors 17 and 18, and this serves to apply start and stop pulses to the counter. The counter reading thus obtained can be used to check the accuracy of the flow meter 14 because the volume of the meter proving pipe between the detecting points 17 and 18 is known.

With respect to the construction of the interchange 11, the outlet end portion 10b of the metering pipe is connected to a flow-tee 22 which has a downwardly extending portion 23 that is coupled to the interchange body 24. This body can include the two tees 26 and 27 and the extension 28. Tee 27 is coupled to an underlying tee 29 (FIG. 2). The inlet end 10a of the metering pipe and the line 12 are connected to the aligned flow passages of tee 29. Also this tee may be provided with interior inclined bars 31, as shown in FIG. 2, to deflect a sphere into the metering pipe. Within the body 24 (FIG. 2) there is a shuttle assembly which is actuated between sphere receiving and sphere launching positions. The interior of the interchange body is circular in transverse section.

Referring to FIGS. 2 – 5, the interchange body just described provides sphere receiving and sphere launching openings 36 and 37. Opening 36 directly communicates with the downwardly extending passage of the tee 22, and the opening 37 directly communicates with the tee 29. Preferably the interchange extends horizontally whereby a sphere moves downwardly by gravity through the opening 36 and also downwardly by gravity from the interchange through the opening 37. Both the openings 36 and 37 are substantially greater in diameter than the diameter of the spheres.

Within the interchange body and between the openings 36 and 37 there is cylindrical sleeve 38. It is shown provided with an annular rib 39 that is clamped between the coupling flanges 40 that are secured to the adjacent portions of the interchange body. The sleeve 38 is concentric with the axis of the interchange body and has an inner diameter greater than the diameter of the spheres being handled.

The shuttle assembly within the interchange body is carried by an operating rod 41 which extends through the end closure wall 42a and is aligned with the axis of the body. Suitable operating means 43, such as a double-acting hydraulic cylinder-piston assembly, is shown mounted upon the closure wall 42a and has its operating piston connected to the rod 41. The other end of the interchange body is shown provided with a movable closure 42b.

The shuttle assembly includes a plunger 44 together with a sphere guard and a sphere carrier. The plunger 44 is attached to the inner end of the operating rod 41 and is an assembly including resilient sealing means whereby a seal is formed with the inner peripheral surface of the sleeve 38 when the shuttle assembly is in the sphere launching position illustrated in FIG. 2. More specifically, the plunger assembly consists of a circular mounting member 45 secured to one end of the rod 41 and serving to mount the resilient sealing members 46. These sealing members are in the form of sealing cups formed of suitable resilient material, such as synthetic rubber. The cups are positioned whereby their resilient flanges 47 extend in opposite directions. Clamping members 48 and 49 serve to clamp the base portions of the sealing members against the member 45. When the sealing members 46 are relaxed as shown in FIG. 4, the exterior diameter of the flanges 47 is substantially greater than the internal diameter of the sleeve 38. When the plunger is moved from the position shown in FIG. 4 to that of FIG. 2, the flanges 47 are flexed and radially contracted as they enter the converging entrant portion 38a of the sleeve 38. When the plunger is within the sleeve 38, the flanges 47 establish seals on axially spaced annular areas.

The guard means 51 extends from one end of the plunger. It can consist of a metal wall 52 (FIG. 5) shaped like the segment of a cylinder. It is attached to the spaced members 53 and 54 which in turn are secured to the operating rod 41. It will be noted that the guard 52 is of substantial length whereby it is engaged by a sphere in either one of the two positions shown in FIGS. 2 and 3. When the shuttle assembly is moved to the sphere receiving position shown in FIG. 4, the guard means is removed from the blocking position and thus permits a sphere to move into the interchange. Suitable means such as shown in said U.S. Pat. No. 3,911,724 can be employed to prevent rotation of the shuttle assembly.

The sphere carrier 56 serves to receive and accommodate a sphere when the shuttle assembly is in the sphere receiving position shown in FIG. 4. It transports the sphere by movement of the shuttle assembly to sphere launching position where it permits the sphere to fall freely by gravity through the opening 37. The particular type of sphere carrier illustrated consists of a cylindrical metal shell 57 which has a diameter substantially greater than the diameter of the sphere, and which has upper and lower openings 58 and 59 in its upper and lower walls, which likewise are of a diameter greater than that of the sphere. One end of this carrier is secured to a mounting plate 60 which in turn is secured to the clamping member 48 of the plunger assembly. A circular plate 61 is secured to the other or free end of the shell 57, and serves to mount an additional sealing member 62. This sealing member is likewise a cup-shaped member made of resilient material, like one of the sealing members 46. The concave side of member 62 is faced away from the plunger assembly. Its base portion is clamped between the plates 61 and 63, and its flange when relaxed likewise has a diameter greater than the inner diameter of the sleeve 38. Sealing member 62 establishes an interchange seal when it is disposed within the sleeve in the position shown for example in FIG. 4. It is dimensioned whereby its flange is contracted radially when moved within the sleeve. By virtue of such contraction the contact pressure of the flange against the sleeve is such that a seal is provided against low pressure differential pressure applied to the convex side (i.e., from opening 36). However, the flange seals against higher pressure differential applied to its concave side (i.e., from opening 37).

The plate 61 also serves to carry a member 64 which is adjustable in the direction of the axis of the interchange body to adjust the effective length of the sphere receiving cavity within the carrier. This member may be in the form of a disk carried by the threaded rod 65, which may likewise serve as means for clamping the members 61 and 63 together.

When the shuttle assembly is in the sphere launching position shown in FIG. 2, the plunger 44 is within the sleeve 38, and therefore interchange seals are formed along annular areas where the flanges of the sealing members 46 contact the inner peripheral surface of the sleeve. Since the concave sides of the flanges are faced in opposite directions, this sealing arrangement provides a seal against differential pressure applied from either side of the plunger. The spacing between the peripheral sealing contact area of that sealing member 46 which is nearest to the sphere carrier, and the sealing contact area provided by the flange of the sealing member 62, is less than the length of the inner cylindrical portion of the sleeve 38. However, at no time are both of the sealing members 46 and the sealing member 62 simultaneously in sealing engagement with sleeve 38.

When the shuttle assembly is moved to the left from the position shown in FIG. 4, the sealing member 62 remains in sealing engagement with the sleeve 38 for a substantial travel of the assembly and until is reaches a position slightly beyond the left hand end of the sleeve 38, as shown in FIG. 3. Before the sealing member 62 has reached the position shown in FIG. 3 and remains in sealing engagement with the sleeve 38, the nearest one of the sealing members of the plunger has entered the sleeve 38. Thus as the shuttle assembly is moved between its sphere receiving and launching positions, the interchange is sealed with respect to flow between the openings 36 and 37 for the full travel of movement of the assembly. However, as previously mentioned at no time during the travel of the shuttle assembly are the sealing member 62 and both the sealing members 46 in sealing engagement with the sleeve 38 simultaneously, which might cause difficulty, particularly when the exchange is being refilled or repressurized with liquid following draining of liquid from the interchange. Under such conditions, if liquid were introduced under pressure with sealing member 62 and both the sealing members 46 in sealing engagement with the sleeve, but without any liquid between the sealing members 62 and 46, excessive differential pressures might be applied to the plunger assembly to cause injury or breakage. When both sealing member 62 and only the nearest one of the members 46 have engagement with the sleeve 38, the space between them can be filled with liquid since they permit passage of liquid at line pressure applied to their convex sides (e.g., from opening 36). However, the pressure differentials experienced during normal meter prover operations are applied from opening 37, and seals are effectively maintained against such pressure differentials, since they are applied to the concave sides of sealing member 62 and/or the nearest member 46.

Guide means is provided for maintaining the backflow preventing means and the sphere carrier properly aligned with the axis of the body. Thus a guide structure 71 in the form of a cylindrical shell has its one end secured to the end of the sleeve which is nearest the opening 37, as by weld connection 72. One side of the shell is cut away to provide the opening 73 which is dimensioned for free passage of a sphere and is in general registration with the opening 37. By way of example, opening 73 may extend over about one-fourth the circumference of the shell. The inner diameter of shell 71 is the same or substantially the same as the inner diameter of the sleeve. The sealing member 62 moves through the shell and is guided by the same when the shuttle assembly is moved from sphere receiving position to the position of FIG. 2. This avoids possible misalignment of the backflow preventing means and the sphere carrier under relatively strong forces that may be applied.

The embodiment illustrated in FIG. 6 is constructed as follows. The body 76 is provided with openings 77 and 78 which connect with the outlet and inlet ends of the metering pipe, and an opening 79 adapted to connect with a bypass pipe 63 as shown in FIG. 1.

The shuttle assembly 81 includes the plunger assembly 82, the sphere carrier 83, the guard means 84, and the backflow preventing means 85. The backflow preventing means 85 is mounted on that end of the sphere carrier 83 remote from the plunger assembly 82.

The body is made up of aligned sections 76a, 76b and 76c, which are annular in section. One end of the body is provided with a removable closure 87, and the other end is provided with the dome-shaped closure 88 which carries operating means for moving the shuttle assembly between its operating positions. The operating means in this instance consists of the threaded rotatable operating rod 89 which extends through the tubular yoke 91, and is journalled at 92 to the bonnet assembly 93. The bonnet assembly includes sealing means 94 which prevents leakage past the operating rod. A nut 96 engages the threads of the operating rod 89 and is carried by one end of the tubular strut 97, which in turn is secured to the guard 84. The guard in this instance consists of a cylindrical member which may be a section of a pipe. Its one end is secured to the plunger assembly 82 and its other end provided with a closure 98 which has a central opening to accommodate the operating rod 89, and which is secured as by welding to the inner end of the strut 97. Motor driven gearing (not shown) serves to drive the operating rod in opposite directions. Other types of power operators can be used, such as operators of the hydraulic type.

The plunger assembly 82 in this instance consists of the annular member 101 which is secured as by means of stud bolts between the clamping plates 102. One of these plates is secured as by welding to the adjacent end of the guard, and the other plate is secured as by welding to the adjacent end of the sphere carrier 83. Oppositely faced cup-shaped sealing members 103, made of suitable resilient material such as synthetic rubber or elastomer, are disposed on opposite sides of the annular member 101. The clamping surfaces of member 101 are recessed to accommodate the base portions 104 of the sealing members, the arrangement being such that in making the final assembly the base portions are squeezed whereby they are secured to the assembly and seals are established between the base portions and the marginal edges of the clamping members 102. The provision of circular ribs on the faces of the base portions, which are squeezed flat against the metal clamping faces, serves to ensure sealed relationship.

The body also includes a cylindrical sleeve 107 corresponding to the sleeve 38 of FIGS. 2 – 4. The inner cylindrical surface 108 of this sleeve has a diameter less than the relaxed diameter of the sealing members 103, but substantially greater than the diameter of the spheres to be handled. The sleeve is provided with an outer annular rib 109 which is disposed between the clamping flanges 111, the latter being secured to the adjacent ends of the body sections 76a and 76b. One end of the sleeve is provided with a tapered entrant portion 112.

The sphere carrier 83 in this instance consists of a cylindrical shell 113 provided with openings 114 and 115 in opposite sides. The inner diameter of the shell 113 is substantially greater than the diameter of the sphere to be handled, and likewise the openings 114 and 115, which may be oval, are dimensioned to readily pass a sphere. One end of the shell 113 is secured as by welding to the periphery of the plate 102. The other end of the shell is secured as by welding to the periphery of the end plate 117.

To provide backflow preventing means, resilient sealing member 118, similar in configuration to the members 103, is carried by the plate 117. The base portion 119 of this sealing member is clamped between the plate 117 and the clamping annulus 121 as by bolts 122. This sealing member is faced in the same direction as the nearest one of the sealing members 103. When relaxed, the flange of the sealing member 118 has the same outer diameter as one of the relaxed sealing members 103, and when moved to a position within the sleeve 107, the flange is contracted and its outer periphery urged into sealing contact with the cylindrical surface 108.

A guide structure 123, in the form of a cylindrical shell and corresponding to the structure 71 of FIGS. 2 – 4, has its one end secured as by welding to the adjacent end of the sleeve 107. One side of this sleeve is cut away to provide the opening 124, which is in general registration with the body opening 78 when the shuttle assembly is in the launching position shown in FIG. 6. The inner diameter of the guide structure 123 is the same or substantially the same as the inner diameter of the sleeve 107.

The body section 76c and the closure 88 are secured together by suitable means such as the bolting flanges 126. Suitable means can be provided within the body section 76c to prevent rotation of the shuttle assembly. For example, a guide channel 126 can be secured to the inner side of the body section 76c, and this can be loosely engaged by a lug 127 which extends from one side of the guard 84. The guard is also shown provided with one or more ribs 120, which are shown tapered, and which serve in effect to form a ramp which is engaged by a sphere within the opening 77 when the shuttle assembly is in sphere launching position. The ramp means facilitates movement of the shuttle assembly to sphere receiving position, during which movement the plunger assembly 87 moves beneath a sphere within the opening 77.

The embodiment of FIG. 6 may likewise be provided with an adjustable member 128, corresponding to member 65 of FIGS. 2 – 4.

Operation of the embodiment illustrated in FIG. 6 is generally the same as the previously described embodiments. As shown in FIG. 6, the shuttle assembly is in sphere receiving position whereby the sphere within the opening 77 moves downwardly within the sphere carrier 83. At that time sealing cup 118 is in sealing engagement with the sleeve 107, and therefore no backflow can occur from the opening 78 such as might interfere with free movement of the sphere into the carrier. Assuming that a sphere is within the carrier, when the shuttle assembly is moved to the left to launching position, from that illustrated in FIG. 6, the sealing member 118 in this instance moves beyond the sleeve 107 and before one of the sealing members 103 moves into sealing engagement with the sleeve 107. Therefore, for an interval in the travel of the shuttle assembly between the sphere receiving and launching positions, the interchange is not sealed, but at that time an interchange seal is not required. When the plunger assembly has moved within the sleeve 107, there is again an interchange seal, and this seal is maintained as the shuttle assembly completes its movement to launching position. When the shuttle assembly is in launching position, the opening 115 in the carrier 113 and the opening 124 in the guide structure 123 are in alignment, and therefore a sphere is free to move downwardly by gravity through the opening 78. Throughout the movement of the sealing member 118 through the sleeve 107, and thereafter through the guide structure 123, the sealing member is guided by its engagement with the inner surfaces of the sleeve and the structure 123, thus maintaining the sealing member and also the carrier upon which it is mounted aligned with the central axis of the interchange body. Thus forces of substantial magnitude may be applied to these parts without causing serious misalignment or injury. When the shuttle assembly is in full sphere launching position, it is located as indicated by dotted lines in FIG. 6. As so located, it will be seen that the major part of the circumference of the sealing member 118 is engaged and guided by the guide structure 123, but a minor portion of its circumference is exposed through the opening 124.

Operation of the apparatus described above is generally the same as described in said U.S. Pat. No. 3,911,724. Before a metering run has commenced, the shuttle assembly is in the position shown in FIG. 4, and the sphere 1 is in the carrier formed by the shell 57. The sealing members 46 of the plunger assembly are retracted from the sleeve 38, while the sealing member 62 is within the sleeve to maintain an interchange seal. At the beginning of a metering run the operator 43 is actuated to shift the shuttle assembly from the position shown in FIG. 4 to that of FIG. 2. During this movement the sealing member 62 moves through the sleeve 38 to the position shown in FIG. 3, at which time one of the sealing members 46 is moving into the sleeve. Thereafter the shuttle assembly progresses to the position shown in FIG. 2, and the sphere 1 is free to drop down by gravity to commence a meter proving run. During such movement member 62 and the carrier 57 on which it is mounted are guided by engagement of member 62 with the inner surface of shell 71. Adjustment of member 65 makes it possible to more precisely control the release of a sphere when the carrier reaches the end of its travel toward sphere launching or release position.

It is important to detect any leakage through the interchange when the shuttle assembly is in sphere launching position. Such leakage can be detected in the manner described in U.S. Pat. No. 3,827,285 issued Aug. 6, 1974. Thus a duct 66 is provided in sleeve 38 and is connected to pressure indicating means (not shown) by pipe 67. When in the launching position of FIG. 2, duct 66 communicates with the closed space between sealing members 46, whereby any change in pressure in this space, caused by leakage, can be detected.

What is claimed is:

1. In meter proving apparatus of the type having a meter proving pipe loop adapted to receive a flow propelled sphere, a hollow interchange body, the body having a first opening through which a sphere may pass from the outlet of a metering pipe loop into the interior of the body and a second opening spaced axially from the first opening through which a sphere may pass from the body to the inlet end of the meter prover loop, a shuttle assembly disposed within the body, the assembly including a plunger and a sphere carrier secured to the plunger, the carrier having a sphere accommodating cavity of limited length, the assembly being movable in opposite directions between a first sphere launching position and a second sphere receiving position, the spacing between the centers of the openings in the body corresponding generally to the distance of movement of the shuttle assembly between its operating positions, a cylindrical sleeve carried by the body and located between said openings, the sleeve having an internal diameter greater than the diameter of the sphere, resilient sealing means carried by the plunger and forming a seal between the plunger and the sleeve, a backflow preventing means carried by the sphere carrier, said means serving to establish a seal for the interchange when within the sleeve, the length of the sleeve and the axial spacing between the sealing means carried by the plunger and the sealing means of the backflow preventing means being such that an interchange seal is maintained for said first and second positions of the shuttle assembly, and means extending from one end of the sleeve for engaging the periphery of and for guiding the backflow preventing means for movements of the shuttle assembly between said first and second positions.

2. Apparatus as in claim 1 in which the sealing means of the plunger assembly consists of two oppositely faced cup-shaped sealing members and the sealing means of the flow preventing means consists of a single cup-shaped sealing member of resilient material having its concave side faced away from the plunger assembly.

3. Apparatus as in claim 1 in which an interchange seal is maintained for all movements of the shuttle assembly to carry out a proving cycle.

4. Apparatus as in claim 1 in which the guide means is a structure having a cylindrical inner surface of a diameter substantially the same as the inner diameter of the sleeve, said structure extending from that end of the sleeve nearest to the second body opening and embracing the flow preventing means for travel of the same outside of said sleeve.

5. Apparatus as in claim 4 in which the structure is a cylindrical shell secured to the sleeve and having an opening in one side of the same which registers with the second body opening, the shell being dimensioned to accommodate the sphere carrier when the shuttle assembly is in said first sphere launching position.

* * * * *